Sept. 14, 1954  T. N. G. LIDMALM  2,689,277
ENGINE FAILURE DETECTOR
Filed June 14, 1951  2 Sheets-Sheet 1

INVENTOR.
Tord N.G. Lidmalm
BY
Emery, Varney, Whittmore &Dix
Attys

Sept. 14, 1954 T. N. G. LIDMALM 2,689,277
ENGINE FAILURE DETECTOR
Filed June 14, 1951 2 Sheets-Sheet 2
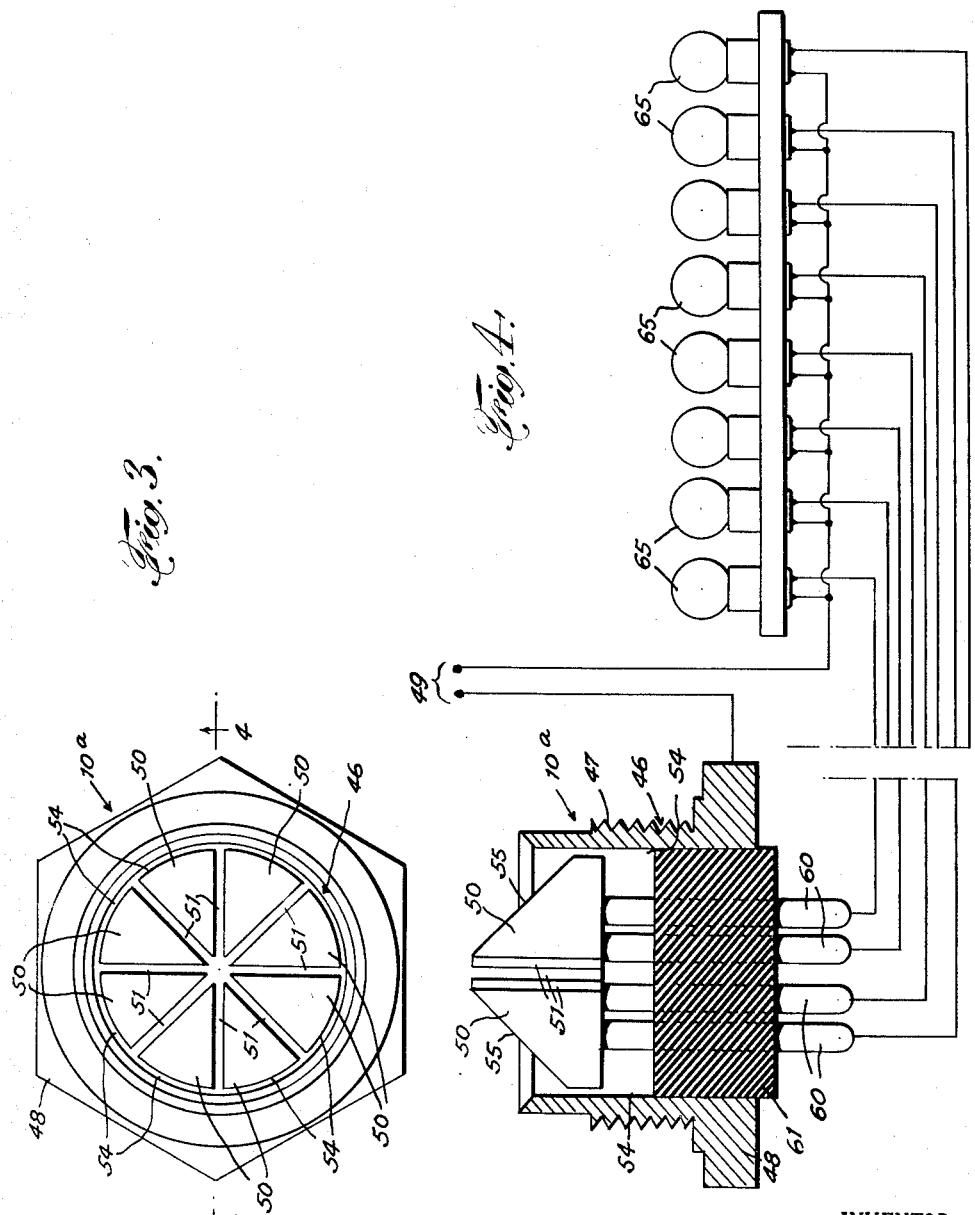
INVENTOR.
Tord N.G. Lidmalm
BY Patented Sept. 14, 1954

2,689,277

UNITED STATES PATENT OFFICE 2,689,277

ENGINE FAILURE DETECTOR

Tord N. G. Lidmalm, Linkoping, Sweden, assignor to Svenska Aeroplan A/B, Linkoping, Sweden, a corporation of Sweden Application June 14, 1951, Serial No. 231,526

1 Claim. (Cl. 200—61.09)

This invention pertains to a novel indicator mechanism for an aeroplane pilot, for a locomotive engineer or for other persons having control or management of internal combustion engines or other oil lubricated apparatus susceptible to failure. More particularly, the invention relates to a device for detecting the presence of metal fragments in the oiling system of an engine, especially an airplane engine, and for giving thereby warning of an incipient failure in the engine at an early stage.

One of the most serious failures which can occur in an engine and which may rapidly lead to its destruction is the seizing of the bearings or pistons in the cylinder bores. Trouble of this kind is usually initiated by the detachment of small metal fragments which are drawn into the engine's oil circulating system and which may give rise to the seizing of other bearing surfaces hitherto intact. These small metal particles rapidly increase in number and may cause total collapse of the engine, unless attended to. Consequently, it is extremely important that a warning of the presence of metal fragments in the engine's lubricating oil should be given at the earliest possible moment, especially in the case of an aircraft where safety depends so much upon reliability of the engines.

One object of the present invention is to provide an engine failure detector, which is sensitive enough to detect the presence of the metal particles of very small size in the engine oil system and which is designed to give not only warning of the presence of these metal particles but also an indication of the degree of engine failure and the rate at which deterioration of the engine is taking place. Another object is to provide a novel detector of the type described which is comparatively simple and has no moving parts, so that the possibility of rendering incorrect indications due to faulty operations of itself is eliminated. A further object is to provide a novel detector of the type described which is easy and quick to mount in existing installations, without material changes therein.

In accordance with certain features of the present invention, the engine detector comprises a plurality of contact elements defining a number of narrow gaps, each in a normally open electric circuit containing an electric light or other suitable electrically controlled warning device. This improved device is adapted to be attached to the oil system of any engine in position to receive in the contact gaps any metal particles in the oil. The gaps are small enough in width, so that even particles a few tenths of a millimeter in size will bridge a gap and thereby close the circuit of said gap. This will cause the lamp in the closed circuit to light up, so that the pilot or control man is given warning of the possibility of engine failure. In view of the fact that a number of contact gaps are distributed in the detector and that corresponding signal lamps controlled thereby are provided, one for each contact gap, the pilot can ascertain from the number of lamps lit and the rate at which the lamps are successively lit, the degree and seriousness of failure and the rate of deterioration of the engine.

Various other objects, features and advantages of the invention are apparent from the following particular description and from an inspection of the accompanying drawings, in which Figure 1 is a longitudinal section of a preferred form of engine failure detector contact unit embodying the present invention;

Figure 3 is a top plan view of another form of engine failure detector contact unit embodying the present invention; and Figure 4 is a section of the detector contact unit taken on lines 4—4 of Figure 3 and shown in connection with the signal lamp system.

Figure 1:
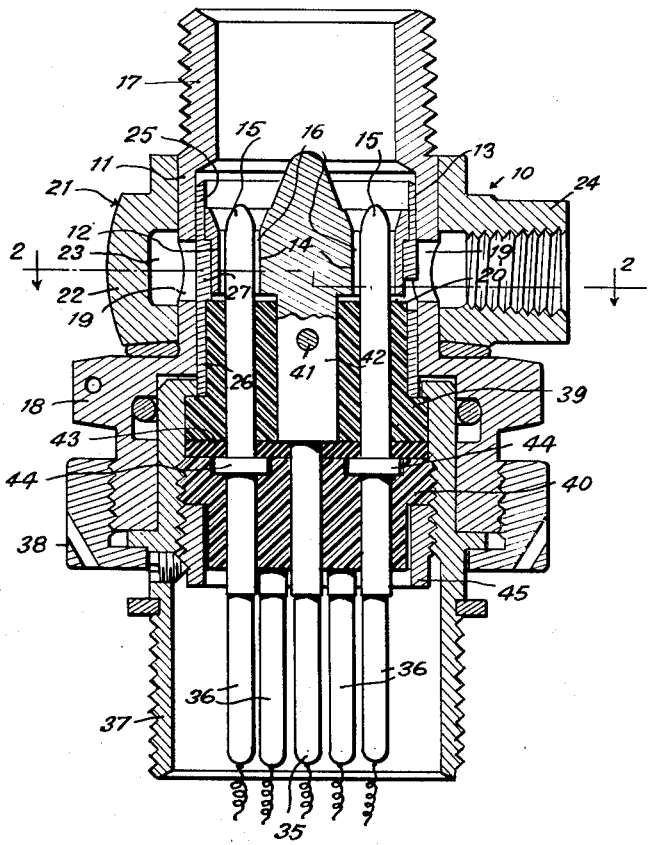
Figure 2:
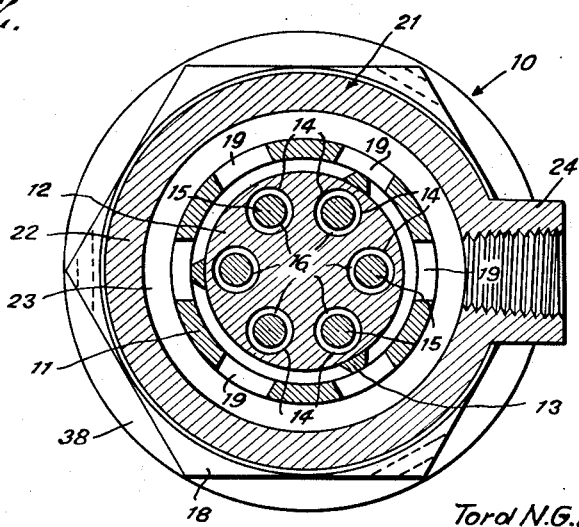
Figure 2 is a transverse section of the detector contact unit taken on lines 2—2 of Figure 1.

Referring to Figures 1 and 2 of the drawings, there is shown the contact unit 10 of the engine failure detector comprising a substantially cylindrical tubular cover 11 housing a central master contact element 12 in the form of a circular plate of electrically conductive material, as for example of silver or other metal. This contact plate 12 is fitted into and seated on a shell 13 lining the inside of the cover 11 along a section of its length, and has a series of cylindrical holes 14, six being shown, arranged symmetrically about the center of said plate. Extending into each of these holes 14 is an electrical contact element 15 in the form of a cylindrical pin of electrically conductive material, as for example of silver, arranged centrally therein and having a diameter slightly smaller than that of the hole to define with the wall of said hole an annular gap 16 of small width around the contact element 15. The width of each gap 16 is small enough to cause metal particles of about a few tenths of a millimeter in size to bridge said gap.

The contact unit 10 is adapted to be usually connected to the oil system of the engine in position to permit the oil in said system to circulate through the contact gaps 16. Towards that end, the cover 11 of the contact unit 10 has an axial tubular projection 17 communicating with one end of the gaps 16 and externally threaded for detachable connection to a part of the oil system, as will be described more fully, and has an hexagonal flange 18 adapted to receive a wrench by which such a connection may be conveniently made. To establish communication between the other ends of the gaps 16 and the oil system, so that the oil in said system will flow past said gaps, the cover 11 has in its peripheral wall a series of holes 19, six being shown, having flow access to said gaps through an opening 20 provided beyond one side of the contact plate 12.

Secured to the cover 11 is a fitting 21 having a ring section 22 which embraces the cover around the section thereof having the holes 19 and which defines with the peripheral wall of said cover an annular manifold chamber 23 communicating with said holes. A diametrical tubular extension 24 in the fitting 21 communicates with the manifold chamber 23 and is internally threaded for connection to a pipe or fitting in the oil system, as will be more fully described.

The shell 13 for supporting the master contact element 12 in position has end sections 25 and 26 of cylindrical shape and an intermediate section 27 of open or skeletonized construction to permit passage of oil therethrough and through the holes 19.

The master contact element 12 has an axial pin extension 35 serving as a terminal for connection to one side or pole of an electrical signalling system and the contact pins 15 have respective axial extensions 36 serving also as terminals for connection to the other side or pole of the signalling system. To protectively house these terminal extensions 35 and 36, and to provide means for connecting a wire conduit (not shown) to the contact unit 10, there is provided a sleeve 37 around these extensions coupled to the cover 11 by a nut 38 and externally threaded to receive this wire conduit.

The contact pins 15 are supported in predetermined spaced relationship by means of a pair of blocks 39 and 40 of suitable insulating material, such as a plastic and more specifically a melamine-formaldehyde resin. The upper block 39 seats the shell 13 and is shouldered against the sleeve 37. This block 39 is secured to the master contact element 12 by means of a pin 41 passing through an axial spindle extension 42 of said contact element.

The lower block 40 is separated from the upper block 39 by a plate 43 of insulating material having packing qualities to prevent leakage of oil into the terminal housing section of the sleeve 37. For that purpose, the plate 43 may be of appropriate material, such as neoprene (chloroprene), pressed with a liquid-tight fit about the contact pins 15 and the axial pin extension 35 of the master contact element 12 and against the internal surface of the sleeve 37.

Collars or flanges 44 on the pins 15 seat on the lower block 40 and a gland 45 threaded into the sleeve 37 retains said block in position in said sleeve.

The electric signal system for the detector is similar to that indicated in connection with the form of invention shown in Figure 4 and preferably comprises a plurality of signal circuits corresponding in number to the number of contact gaps 16 and connected across a source of electric power, one pole of which is connected to the master contact element 12. Each of these electric circuits comprises a signal lamp and a corresponding gap 16, one side of the gap being connected to the master contact element 12, the other side of said gap being connected through the corresponding contact pin 15 with one side of the lamp. The other side of the lamp is connected to the other pole of the source of power.

The six signal lamps in the specific form of the invention shown in Figures 1 and 2, one for each contact gap 16 would be mounted on the cockpit lamp panel, dashboard, or switch board or in any position within easy sight of the pilot or control person.

If the detector is supplied with direct current, electrolysis may occur, accompanied by disintegration of the oil and migration of the contact material. For that reason, it is generally desirable to use alternating current which is available in modern aircraft for a variety of other purposes.

For use, the contact unit 10 may be connected to the oil system of the engine by screwing the cover projection 17 into the engine's oil sump and by screwing the return oil pipe from the engine into the pipe connection 24. With the contact unit 10 so mounted, return oil from the system passes into the pipe connection 24 into the manifold chamber 23, through the holes 19, into one end of the gaps 16, out through the other end and into the passage of the cover projection 17 for discharge into the sump. During this flow process, any metal fragments in the oil, even of a few tenths of a millimeter in size will bridge the gap 16 it is trying to pass through and close the circuit of the corresponding signal lamp, thereby lighting up said lamp. If more than one gap 16 is being bridged by metal fragments in the oil, a corresponding number of signal lamps will light up. In view of the fact that a number of signal lamps are provided for each detector, the pilot can ascertain from the number of lamps lit and the rate at which the lamps become successively lit, whether the engine is failing rapidly and the extent of failure. If the detector indicates a serious condition, measures can be taken early and further destruction of the engine can be prevented by switching it off. If the signals indicate a less serious condition, action may be deferred until after the flight.

Instead of mounting the detector contact unit 10 in the manner described, it may be employed as an oil drain plug for the engine by screwing the cover projection 17 into the crankcase or sump in place of the ordinary oil drain plug. When so employed, the pipe connection 24 may serve as the outlet for the plug or if desired may be shut off by a valve or a stop, or may be connected to a bleed line to permit continuous circulation of the oil through the contact unit 10. Any metal fragments gravitating in the crankcase or sump will find their way to the contact unit 10 and signal their presence to the pilot through the lighting of the signal lamps.

It should be noted that the contact gaps 16 are of substantial length, so that the possibility of a metal fragment of detectable size passing through a gap quickly before closing the corresponding circuit and of therefore escaping detection is remote. Even though such a fragment may take some time to pass through a gap 16 because of its length, this does not interfere with flow therethrough because of the annular shape of the gap. Moreover, the multiplicity of other gaps in the contact unit 10 preclude harmful interference with the circulation of the oil through said unit.

In Figures 3 and 4 is shown a form of contact unit 10a which is particularly useful for connection to a low point of an oiling system. It may be employed as an oil drain plug and for that purpose may be screwed into the crank case or sump of the engine.

The contact unit 10a comprises a tubular fitting 46 with a cylindrical bore, having an externally threaded section 47 for connection to the crankcase or sump and an hexagonal flange 48 at one end adapted to receive a wrench by which such a connection may be conveniently made. This fitting 46 serves as the master contact element of the detector and for that purpose is grounded or connected to one side of a source of current 49, which current supply is preferably of alternating current.

Inside the fitting 46 is a series of contact elements 50 of highly conductive material, eight being shown, conjointly forming a circular block assembly in the center of the bore of the fitting and each forming a sector of said block assembly. The radial sides of adjoining sector contact elements 50 are separated by small spaces 51 and the outer arcuate side of each contact element 50 is spaced from the inner peripheral surface of the fitting 46 by a very narrow gap 54 desirably small enough in width to be bridged by metal particles of a few tenths of a millimeter in size. The radial spaces 51 between adjoining contact elements 50 are of similar small width.

In order to direct the metal particles in the oil towards the contact gaps 54, the circular block assembly defined by the conjuncture of the contact elements 50 is generally frusto-conical in shape, so that each contact element has an upper surface 55 inclined from the apex of said element downwardly and outwardly toward the corresponding gap 54.

Secured to each of the contact elements 50 is a pin 60 of highly conductive material serving as a terminal for connection to the electrical signal system. These terminal pins 60 are supported in a block 61 secured inside the fitting 46 in any suitable manner. This block 61 is made of insulating material, or if desired may be of metal and the part of each terminal pin 60 passing through said block may be sheathed therefrom by an insulating sleeve.

The electric signal system for the detector of Figures 3 and 4, comprises a series of signal lamps 65, eight being shown, one for each contact gap 54, the lamps being arranged on the cockpit dashboard or panel board in position to be easily seen by the pilot. One side of each lamp 65 is connected to one side of the current source 49, the other side of the lamp being connected by a conductor wire to a corresponding contact terminal 60. The signal system thereby comprises eight circuits connected across the current source 49, each circuit containing a lamp 65 and a corresponding contact gap 54.

In operation, metal particles in the oil gravitate towards the contact unit 10a and slide along the inclined surfaces 55 of the contact elements 50 until they find their way into the contact gaps 54. As soon as a metal particle in a contact gap 54 bridges said gap, it closes the circuit of the corresponding signal lamp 65 and lights up said lamp. If a number of contact gaps 54 are bridged by metal particles, a corresponding number of signal lamps 65 will light up, so that the pilot will be made aware of the fact that the oil is more fully contaminated with metal particles than in the case where a single lamp 65 lights up. The pilot under these conditions may take the necessary steps or precautions.

Some metal particle may find its way into a radial space 51 between adjoining contact elements 50 and bridge said space. In that case, two signal lamps 65 in the circuits of these contact elements 50 will light up, providing, of course, that the gap 54 between either one of said contact elements and the fitting 46 is spanned by a metal particle.

In this improved type of detector where there is a plurality of gaps or definite spaces, at least two gaps or spaces being desired as a minimum, it will be noted that the temporary presence of a particle that is of electrically conducting nature in one gap will not cause the pilot or engine control man to give immediate attention to the engine but will act as a warning so that he will keep close attention to the number of unlighted lamps. In some instances, such electrically conducting particles may be a small piece of coke or a droplet of water as well as the metal particles. However, the coke or water droplet will cause the light to light, at least temporarily.

It will be noted that the improved detector herein is simple, has no moving parts, but will automatically indicate to the pilot or the control man that the engine giving the power is operating satisfactorily or will warn the pilot or operator that one or more of his engines are failing. It will also be seen that the detector may be quickly installed in a flow line of the oil supply, or in a bleed line of the oil flow, or may be placed in the sump and catch the metal particles as they fall down.

While the invention has been described with particular reference to specific embodiments, it is to be understood that it is not to be so limited thereby but is to be construed broadly and restricted solely by the scope of the appended claim.

What is claimed is:

A contact unit for a device for detecting the presence of metal particles in an oil system of an engine, comprising a master contact element in the form of a tubular fitting having a cylindrical bore, and a series of individual contact elements each having an arcuate surface opposite the wall of said fitting and being concentric with said wall and spaced therefrom to define a contact gap, said individual contact elements conjointly forming a substantially frusto-conical block assembly in the center of the bore of said fitting, each of said individual contact elements being in the shape of a sector with an inclined surface along which the metal particles are adapted to slide towards the corresponding contact gap.

References Cited in the file of this patent

UNITED STATES PATENTS

| Number | Name | Date |
| --- | --- | --- |
| 2,252,222 | Van Os | Aug. 12, 1941 |
| 2,420,177 | Krall | May 6, 1947 |

OTHER REFERENCES

Publication on page 45 of the May 15, 1950, issue of Aviation Week.